Reissued Nov. 7, 1933 Re. 18,989

UNITED STATES PATENT OFFICE 18,989

SMOKELESS POWDER

Sereno G. Norton, Brunswick, Ga., assignor to Hercules Powder Company, Wilmington, Del., a corporation of Delaware No Drawing. Original No. 1,788,438, dated January 13, 1931, Serial No. 281,360, May 28, 1928. Application for reissue August 29, 1933. Serial No. 687,312

9 Claims. (Cl. 52—13)

My invention relates to an improvement in smokeless powder and more particularly to the so-called single and double base powders.

Heretofore in the production of double base smokeless powder it has been known to incorporate nitroglycerin with nitrocellulose, as wet gun cotton, or wet collodion nitrocotton, the incorporation being effected through the medium of heated rolls, with the addition, if desirable, of small amounts of a stabilizer, as diphenylamine, centralite, or the like. The advantages of such process lie primarily in the fact that water in the nitrocotton is evaporated by the heat of the rolls, thus avoiding the necessity for dehydrating the nitrocotton with, for example, alcohol, and in fact that the plant equipment required may be readily and expeditiously assembled in times of emergency. Such process, however, possesses certain disadvantages, more particularly, that the nitroglycerin is highly sensitive and local explosions or snapping is likely to occur on the rolls during the incorporation of the ingredients.

Now in accordance with my invention I have discovered that if an abietate, as for example, an alkyl abietate, an aryl abietate, or the like be added to wet gun cotton or wet collodion nitrocotton, together with a desirable amount of nitroglycerin, and, if desirable, a stabilizer, that a smokeless powder having definite advantages will be produced and that the process of incorporation will be speeded up, a more homogeneous mixture produced and local explosions or snapping, on the rolls, avoided.

The smokeless powder in accordance with my invention will have a reduced temperature of burning in, for example, a rifle barrel with reduction of muzzle flash, erosion and operating temperature of the barrel. At the same time, the abietate will, during the incorporation of the ingredients, act as a desensitizer to an extent sufficient to avoid local explosions, or snapping, on the hot rolls, and due to its colloiding power on the gun cotton or nitrocotton will act to speed up the incorporation of the ingredients and promote the production of a more homogeneous mixture than heretofore.

In the production of a smokeless powder in accordance with my invention, I may use as the abietate, for example, an alkyl abietate, as ethyl abietate, methyl abietate, or the like, an aryl abietate, as phenyl abietate, or the like, an aralkyl abietate, as benzyl abietate, or the like. The abietate may be produced, for example, by the treatment of abietic acid. relatively pure, or as present in rosins, as wood or gum rosin, with, for example, an alkyl halide, or an aryl halide, or the like, in the presence of an alkali, as sodium or potassium hydroxide, or the like. The treatment is preferably effected with the ingredients in solution, for example, in alcohol, and with the application of heat and pressure, the abietate being recovered by distillation, preferably under reduced pressure.

The composition of a double base smokeless powder in accordance with my invention, using, for example, ethyl abietate, which may be prepared, for example, by the heating of abietic acid, or wood rosin, with ethyl chloride in the presence of sodium hydroxide in solution in alcohol, the ethyl abietate being recovered by distillation under reduced pressure, is illustrated by the following formula:

| | Parts |
|---|---|
| Wet nitrocotton (nitrogen 13.30%) | 70 |
| (dry basis) | 50 |
| Nitroglycerin | 30 |
| Ethyl abietate | 5–10 |
| Barium nitrate | 6 |
| Potassium nitrate | 2 |
| Diphenylamine | 0.75 |

Double base smokeless powders in accordance with my invention may be produced with the essential ingredients within varying ranges of proportions, for example, as indicated in the following table:

| | Parts |
|---|---|
| Wet nitrocotton | 90–60 |
| (dry basis) | 63–42 |
| Nitroglycerin | 5–30 |
| Abietate | 5–10 |

To powders having the essential ingredients within the ranges indicated in the above table may be added various desirable additional ingredients, and it will be understood that various abietates may be used in proportions within the range specified in the above table, the particular proportion of any particular abietate being readily determined.

My invention is adaptable to application to what are known as single base powders, i. e. nitrocellulose powders which do not contain nitroglycerin as an ingredient, and for the production of such powders the abietate is incorporated with wet nitrocellulose, and wet gun cotton, or wet collodion nitrocotton in the same manner as when nitroglycerin is also used for the production of the so-called double base powders.

The composition of a single base powder embodying my invention is illustrated by the following formula.

| | Parts |
|---|---|
| Wet nitrocellulose | 120 |
| (dry basis) | 85 |
| Abietate | 10–20 |

In the production of single base powders in accordance with my invention, various ingredients, as a stabilizer, etc., in addition to nitrocellulose and an abietate, may be included and the essential ingredients may be used in varying proportions as indicated by the following table:

| | Parts |
|---|---|
| Wet nitrocellulose | 95–75 |
| (dry basis) | 52½–66½ |
| Abietate | 5–25 |

In the production of single base powders various abietates may be used, in quantities within the ranges indicated in the above table, and the powder will be produced in a manner similar to that described in connection with double base powders. The addition of an abietate to single base powders will involve the same advantages as in the case of double base powders, but to a lesser extent, due to the absence of the nitroglycerin present in the double base powders.

What I claim and desire to protect by Letters Patent is:

1. A smokeless powder including as ingredients nitrocellulose and an abietate.
2. A smokeless powder including as ingredients nitrocellulose and ethyl abietate.
3. A smokeless powder including as ingredients nitrocellulose, nitroglycerin and an abietate.
4. A smokeless powder including as ingredients nitrocellulose and an alkyl abietate.
5. A smokeless powder including as ingredients nitrocellulose, nitroglycerin, and an alkyl abietate.
6. A smokeless powder including as ingredients nitrocellulose within the range 90–60 parts and an abietate within the range 5–25 parts per 100 parts of finished explosive.
7. A smokeless powder including as ingredients nitrocellulose within the range 90–60 parts and ethyl abietate within the range 5–25 parts per 100 parts of finished explosive.
8. A smokeless powder including as ingredients nitrocellulose within the range 90–60 parts, an abietate within the range 5–25 parts per 100 parts of finished explosive and nitroglycerin.
9. A smokeless powder including as ingredients nitrocellulose within the range 90–60 parts, ethyl abietate within the range 5–25 parts per 100 parts of finished explosive and nitroglycerin.

SERENO G. NORTON.